United States Patent [19]
Nishibori

[11] Patent Number: 4,928,943
[45] Date of Patent: May 29, 1990

[54] SHEET FEEDING ARRANGEMENT
[75] Inventor: Toshiki Nishibori, Nara, Japan
[73] Assignee: Sharp Kabushiki Kaisha, Osaka, Japan
[21] Appl. No.: 265,919
[22] Filed: Nov. 2, 1988
[30] Foreign Application Priority Data Nov. 9, 1987 [JP] Japan ................. 62-282816

[51] Int. Cl.⁵ .............................. B65H 5/22
[52] U.S. Cl. .......................... 271/4; 271/7; 271/10; 271/225; 271/65; 271/186; 271/204
[58] Field of Search ........................ 271/3–7, 271/10–12, 90, 91, 93, 104, 113, 225, 277, 65, 184–186, 204, 902

[56] References Cited

U.S. PATENT DOCUMENTS

| 4,000,864 | 1/1977 | Kurtz et al. | 271/277 X |
| 4,085,673 | 4/1978 | Wierszewski | 101/242 |
| 4,404,905 | 9/1983 | Simeth et al. | 271/277 X |
| 4,506,876 | 3/1985 | Nishibori | 271/104 |
| 4,569,284 | 2/1986 | Witczak | 271/186 X |
| 4,736,937 | 4/1988 | Okuda et al. | 271/902 X |
| 4,799,664 | 1/1989 | Burger | 271/277 |

FOREIGN PATENT DOCUMENTS

| 539406 | 1/1931 | Fed. Rep. of Germany. | |
| 3641984 | 6/1987 | Fed. Rep. of Germany | 271/93 |

Primary Examiner—Joseph J. Rolla
Assistant Examiner—David H. Bollinger
Attorney, Agent, or Firm—Birch, Stewart, Kolasch & Birch

[57] ABSTRACT

A sheet handling apparatus for copying and transporting sheets which comprises an image processing apparatus containing an image processing face, a sheet processing device disposed above said image processing face and operative to move toward and away from said image processing face, a sheet transport device including a pair of wrapping connector driving devices constituted by a combination of chains and sprockets, said sheet transport device turning on itself to form a loop which passes between said image processing apparatus and said sheet pressing device in sequential, opposite directions, a driving mechanism for driving the sheet transport device, a sheet gripping mechanism connected to said wrapping connector driving device for gripping the edges of the sheet being transported, a sheet pickup device for successively selecting the sheets, one-by-one, for distribution to the sheet gripping mechanism, and a sheet discharge device for receiving and transporting sheets received from the sheet transport device, whereby the front and reverse surfaces of said sheet can be successively brought into close contact with the image processing face through the use of the sheet pressing device.

12 Claims, 4 Drawing Sheets

SHEET FEEDING ARRANGEMENT

BACKGROUND OF THE INVENTION

The present invention generally relates to a sheet handling apparatus and more particularly, to a sheet feeding arrangement to be used for positively copying and transporting sheets, one by one in a copying apparatus, electronic file facsimile device, printing press or the like.

Conventionally, there have been proposed various document feeding apparatuses arranged to transport original documents in a sheet form picked up sheet by sheet, up to a predetermined position and, for example, after subjecting the sheet to image processing, adapted to discharge the sheet thus processed onto a discharge tray.

In FIG. 4, showing the most common example of such known feeding apparatus, a sheet P sent out by a sheet pick-up device 110 from a stack of sheets placed on a sheet feeding table 114, is transported to a predetermined sheet processing position by a transport device 120 including an endless belt 126 movably supported by rollers 125. The sheet P is depressed by the belt 126, i.e., through the utilization of friction between said belt 126 and the sheet P and also the friction between said sheet P and the surface of a transparent platform, e.g., a platen glass 141 for the image processing section of an image processing device 140 on which the feeding apparatus is mounted. At a predetermined position, the sheet P transported by said belt 126 is subjected to image processing under the state where said sheet is pressed against the platen glass 141 as stated earlier for subsequent discharge of said sheet P onto a discharge tray 130. In FIG. 4, the image processing device 140 includes, for example, an exposure device 56 for the sheet P adapted to be displaced from a position indicated by a solid line to a position shown by a dashed line in a direction of an arrow f.

In the above known arrangement, however, since the transport is effected through utilization of friction, there are various disadvantages such as a tendency to damage the sheets, soiling a the sheet surface, tendency to cause slippage with respect to the sheets having a low surface coefficient of friction, deformation of the belt during transportation, fluctuation of tension, zigzag movement due to an imbalance in the roller configuration, and a tendency to electrically charge the sheets due to a large depressing force, etc.

In order to eliminate such disadvantages as referred to above, there has also conventionally been proposed an apparatus which is arranged to attract the sheet through a utilization of air-suction so as to transport said sheet thus attracted as illustrated in FIG. 5.

The sheet feeding apparatus utilizing the air-suction as shown in FIG. 5 further includs a sheet attracting section 150 formed with air suction holes in the bottom surface, and connected with a suction air causing 160 in which a negative pressure chamber and a negative pressure generating device are provided. The sheet attracting section 150 and the suction air causing 160 are disposed within the loop of the belt 126' so as to attract one side face of the sheet P to the sheet attracting section 150, thereby transporting the sheet as it is attracted at one side face through movement of the belt 126' or rotation of a frictional member such as a roller or the like (not particularly shown). In FIG. 5, like parts in FIG. 4 are designated by like reference numerals for brevity of description.

However, the conventional sheet feeding arrangements as described so far are disadvantageous, particularly when thin sheets are to be dealt with. Also, adjustment of its suction force is troublesome, and even thin and thick sheets are present in a mixed state, transportation thereof is difficult due to the above reason. With respect to a sheet having a high transparency, not only the soiling of the belt, but also that of the suction holes is undesirably transferred. Similarly, regarding the occurrence of the zigzag movement, no fundamental countermeasures are available with respect to the former arrangement which does not utilize the suction air. Meanwhile, the latter arrangement which utilizes air suction leads to a large size of the apparatus due to the necessity for the suction air casing, etc.

Furthermore, in any of the above known arrangements, it is difficult to effect the sheet discharge in a stable state due to undesirable electrical charging of the sheet.

Additionally, in the case where a sheet having images on both side faces is to be dealt with, a very complicated transport conveyance must be provided if the above arrangements are adopted, thus increasing the frequency of problems during the transportation.

SUMMARY OF THE INVENTION

Accordingly, an essential object of the present invention is to provide a sheet feeding arrangement which is free from soiling or damaging the sheets being conveyed and is also capable of sorting the sheets without giving rise to problems even when a sheet having images on its opposite side faces is to be dealt with.

Another object of the present invention is to provide a sheet feeding arrangement of the above described type which is compact in size and stable in functioning at high reliability.

In accomplishing these and other objects, according to the present invention, a sheet pressing device is provided for causing front and reverse faces of the sheet to closely contact the copying surface.

More specifically, according to one preferred embodiment of the present invention, there is provided a sheet feeding arrangement which includes a sheet pick-up device for successively dispensing a plurality of sheets stacked on a sheet feeding table, one by one, a sheet transport device, including a pair of wrapping connector driving devices having chains passed around sprockets, a sheet gripping device attached to said chains for movement in one loop following movement of said chains around said sprockets, a gripping portion open/close mechanism for the selective opening and closing of gripping portions of said sheet gripping device and a driving device for driving said wrapping connector driving devices, a sheet pressing device for causing the sheet gripped by said sheet gripped device to closely contact an image processing face at the front and reverse surfaces of said sheet, and a sheet discharge device for receiving and sending out the sheet transported by said sheet transport device onto a sheet discharge tray.

By the above arrangement of the present invention, an improved sheet feeding arrangement has been advantageously presented through a simple construction.

BRIEF DESCRIPTION OF THE DRAWINGS

These and other objects and features of the present invention will become clear from the following description taken in conjunction with the preferred embodiments thereof with reference to the accompanying drawings, in which:

FIG. 2 (b) is a side elevational view showing on an enlarged scale, an essential portion of the sheet gripping device employed in the sheet feeding arrangement in FIG. 1;

DETAILED DESCRIPTION OF THE INVENTION

Figure 1:
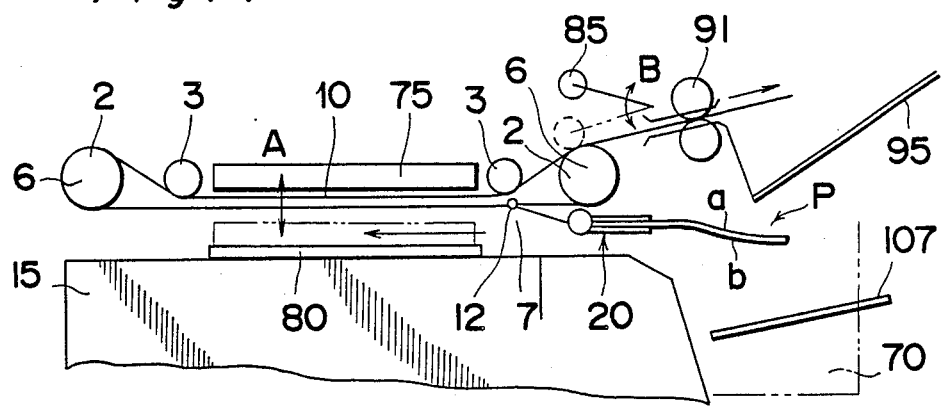
FIG. 1 is a schematic side elevational view of a sheet feeding arrangement according to one preferred embodiment of the present invention.

Before the description of the present invention proceeds, it is to be noted that like parts are designated by like reference numerals throughout the accompanying drawings.

Figure 2:
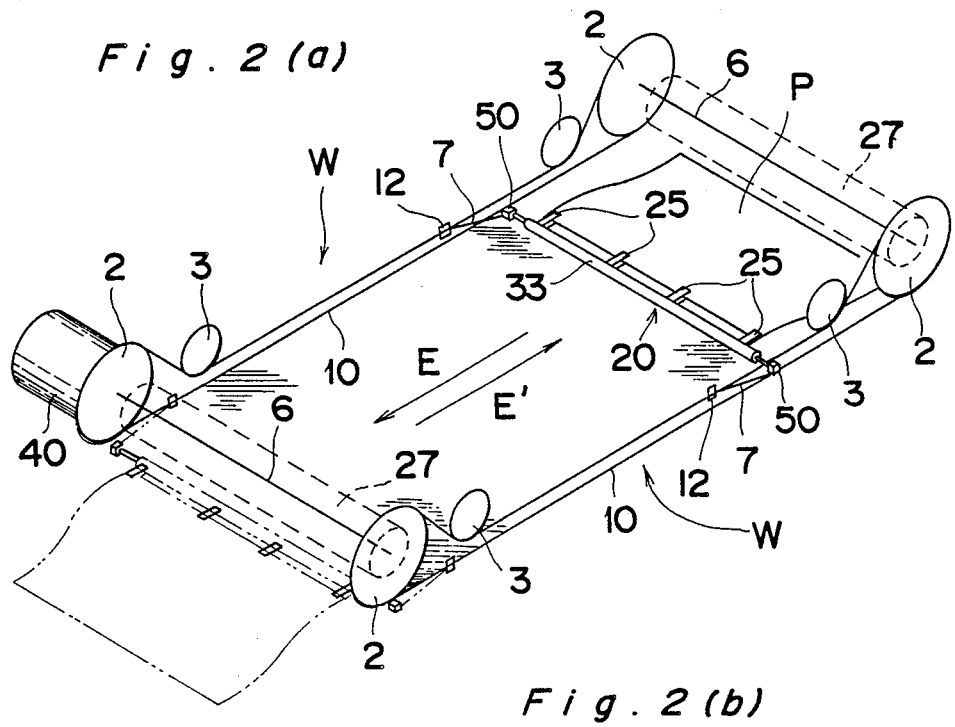
FIG. 2 (a) is a perspective view of a sheet transport device employed in the sheet feeding arrangement in FIG. 1.
Figure 2:
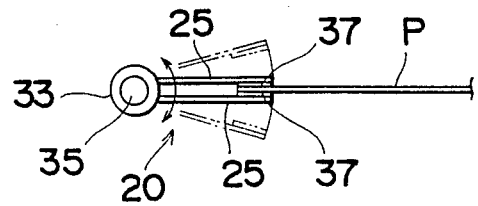

Referring now to the drawings, there is shown in FIGS. 1 to 2(b), a sheet feeding arrangement according to one preferred embodiment of the present invention, which generally includes a sheet pick-up device 70 for successively sending out a plurality of sheets P stacked on a sheet feeding table 107 one sheet by one sheet, a sheet transport device further including a pair of wrapping connector driving devices W having chains 10 passing around sprockets 2 and 3, a sheet gripping device 20 attached to the chains 10 for the movement in one loop following movement of the chains 10 around the sprockets 2 and 3, a gripping portion open/close mechanism for selective opening and closing the gripping portions 25 of the sheet gripping device 20 and a driving device for driving the wrapping connector driving devices, W, a sheet pressing device 75 for causing the sheet P gripped by the sheet gripping device 20 to closely contact an image processing face at the front and reverse surfaces of the sheet, and sheet discharge devices 85 and 91 for receiving and discharging the sheet transported by the sheet transport device onto a sheet discharge tray 95.

More specifically, the sheet pick-up device 70 may be, for example, of a roller, air-suction device or the like which is arranged to deliver one, sheet at a time, with the sheets P from the stack of sheets being placed on the sheet feeding table 107. An image processing device 15 for processing the image carried by the sheet, for example, a copying apparatus, scanner or the like is intended to process the image on the sheet P placed on the platen glass 80 thereof.

As shown in FIG. 2 (a), in each of the wrapping connector driving devices W, the chain 10 is passed around the spaced sprockets 2, 2, 3 and 3, and the sheet gripping device 20 is attached between said chains 10. As illustrated in FIG. 2(b), the sheet gripping device 20 further includes a plurality of gripping claws 25, each having resilient frictional members 37 at the forward ends thereof and attached to a gripping claw support member 33 so as to be selectively opened or closed about a shaft 35 through a predetermined angle as shown by dash lines in FIG. 2(b). The opening or closing of the gripping claws 25 is to be effected by a gripping portion open/close mechanism (not shown).

The sheet gripping device 20 is attached at its opposite ends to attachment pieces 12 fixed to the chains 10 through arms 7 having gripping device mounting portions 50, and thus, movable in the directions indicated by arrows E and E' following movement of the chains 10 in a loop.

The sprockets 2, 2 and 2, 2 are connected in respective pairs by shafts 6 and 6 so as to correspond to the chains 10 at both sides, with one of said sprockets 2 being connected to a chain driving motor 40. Moreover, each of the shafts 6 and 6 is provided with an inversion assisting roller 27 for serving as a guide member during the turning over of the sheet P.

The sheet transport section having the construction as described above is provided to be located above the platen glass 80 of the image processing apparatus 15 as shown in FIG. 1 The sheet feeding arrangement according to the present invention further includes the sheet pressing device 75 movably disposed for vertical movement by a driving device (not shown) in directions as indicated by arrows A in FIG. 1. The sheet pressing device positively depresses the sheet P fed up to the predetermined image processing position by the sheet transport section referred to above, onto the platen glass 80, and also the sheet discharge device constituted by the sheet discharge rollers 85 and 91, for discharging the sheets P completed for processing onto the sheet discharge tray 95, etc.

The functioning of the sheet feeding arrangement as described so far will be explained hereinafter with reference to FIGS. 3(a) through 3(f) in which numeral 30 denotes an air-suction type double sheet feeding preventing device.

In the first place, description is given with respect to the case where the sheet having images on both side faces (surface a, surface b) is to be successively dealt with, and the sheet pick-up device 70 is of the air-suction type.

In FIG. 3 (a), the sheet gripping device 20 goes to fetch a first sheet P1 delivered from the stack on the sheet feeding table 107 by the sheet pick-up device 70 having an air-suction type sheet attracting device O, and grips the forward edge of the sheet P1 by opening and closing the plurality of gripping claws 25 through the gripping portion open/close mechanism (not shown). In this case, since the resilient frictional members 37 are provided at the forward ends of the respective gripping claws 25, the sheet P1 may be gripped by a uniform strength over the entire widthwise direction thereof in a stable state.

Figure 3A:
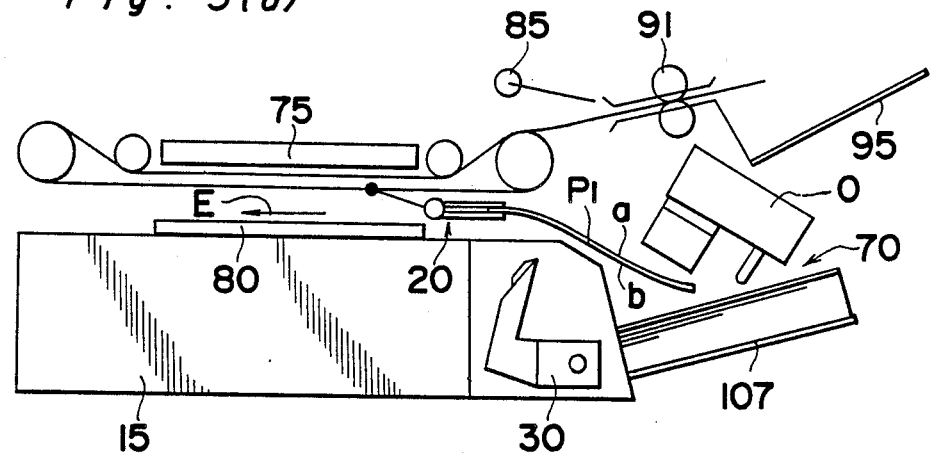
FIGS. 3(a) to (f) are diagrams explaining the sequence of operation of the sheet feeding arrangement of FIG. 1.
Figure 3B:
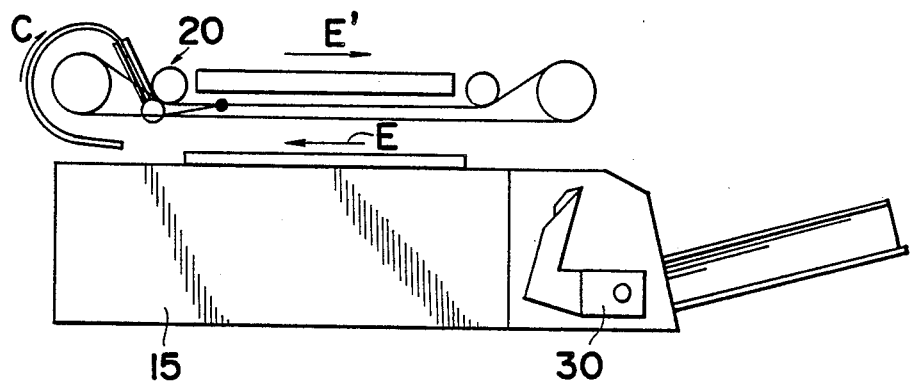
Figure 3C:
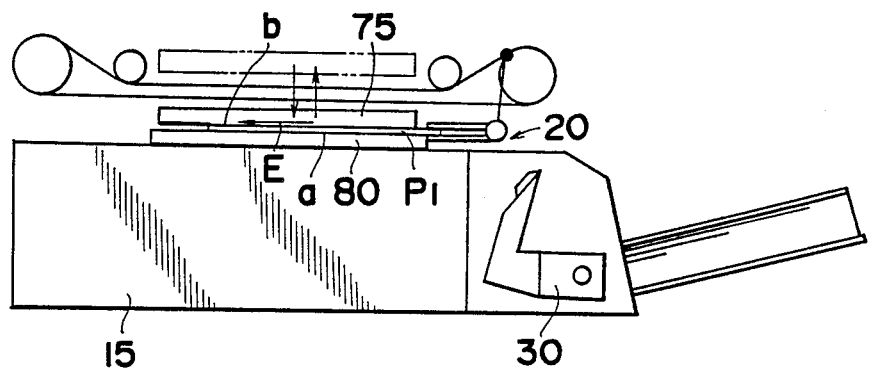
Figure 3D:
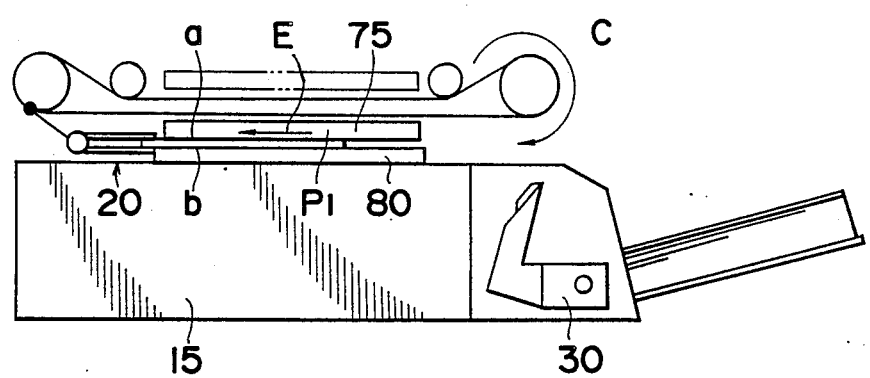
Figure 3E:
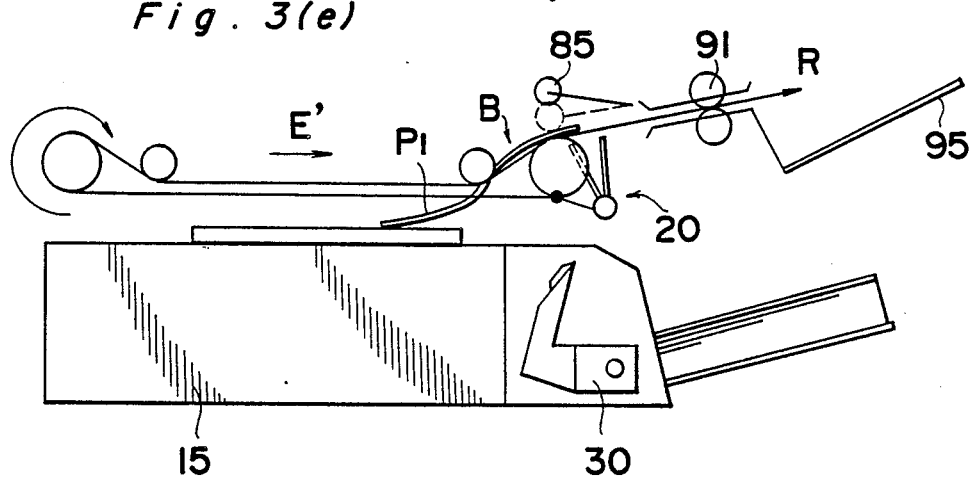
Figure 3F:
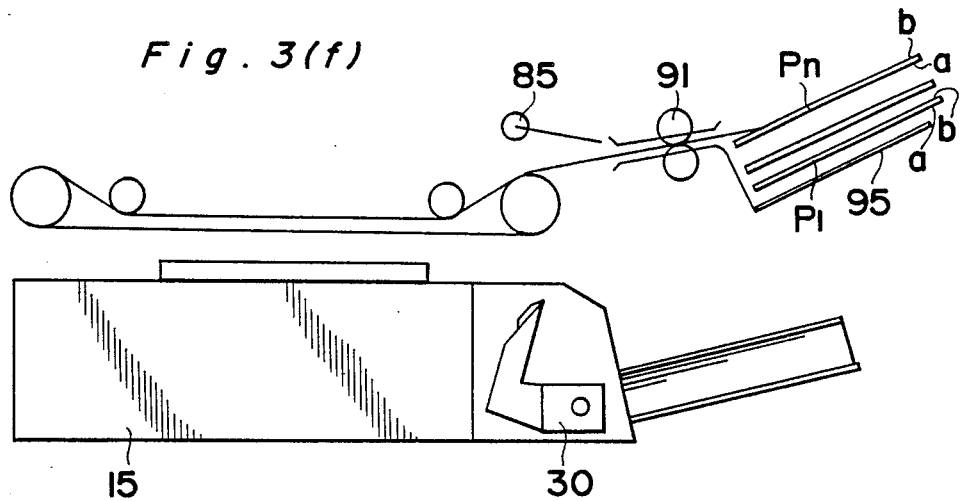
Figure 4:
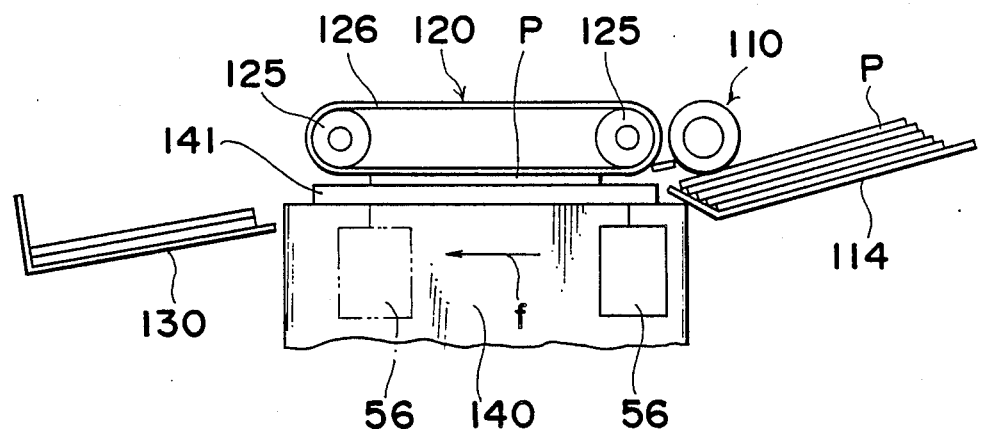
FIG. 4 is a schematic side elevational view of a conventional sheet feeding arrangement.
Figure 5:
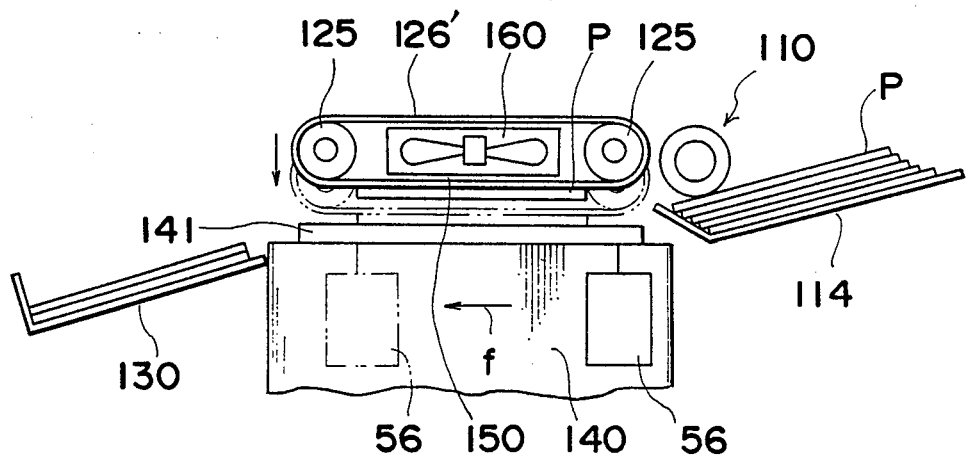
FIG. 5 is a view similar to FIG. 4, which particularly shows a modification thereof.

Subsequently, the sheet gripping device 20 thus gripping the sheet P is transported by the chains 10 driven by the chain driving motor 40 in the direction of the arrow E. After turning over the sheet P1 in a direction indicated by an arrow C as shown in FIG. 3 (b), the sheet gripping device 20 displaces the sheet to the right as indicated by the arrow E' for positioning, and the surface a of the sheet P1 is processed by the image processing device 15 as shown in FIG. 3(c). As described earlier, the above processing is effected under the state where, after the sheet gripping device 20 has stopped at the predetermined processing position, the sheet pressing device 75 positively depresses the sheet P1 onto the platen glass 80 as a processing surface by a driving means (not shown). Upon completion of the processing, the sheet pressing device 75 is raised to release its pressing function.

Subsequently, as shown in FIG. 3 (d), the sheet P1 is further turned over as indicated by an arrow C', and after positioning by displacing the sheet gripping device 20 leftwards in the figure, the sheet pressing device 75 is lowered in the similar manner as in the processing of the surface as described above for pressing the sheet P1 against the upper surface of the platen glass 80 for the image processing on the surface b. In other words, the sheet P1 is successively processed for surface a first, and then for the surface b.

In the above case, as described earlier with reference to FIG. 2(a), since the inversion assisting roller 27 is provided around each of the shafts 6 for connecting he sprockets 2, the sheet P is reduced in its radius of curvature when it forms the loop as in the arrow C or C' during the inversion, and thus, inversion problems due to the undesirable folding of the sheet, etc. may be advantageously prevented.

Moreover, the sheet P as inverted may be subjected to the image processing for the surface b also after having been positioned with respect to the image processing device 15, in exactly the same manner as in the processing of the surface a, due to the fact that the upper run and lower run of the chain 10 are close to each other by the function of the arms 7 attached to the attachment pieces 12 and the gripping device mounting portions 50, and the action of the sprockets 3 for imparting the tension, and also, by the action of the sheet pressing device 75.

As shown in FIG. 3 (e), the forward edge of the sheet P1 completed for image processing on both surfaces a and b is held between the sheet feeding roller 85 and the inversion assisting roller 27 (FIG. 2(a)) so as to be transported in a right direction as indicated by an arrow R by moving the first sheet discharge roller 85 adapted to be pivotable downwards in the direction of the arrow B into a position shown by dash lines. At this time, the sheet gripping device 20 is opened by the gripping open/close mechanism (not shown) to set the sheet p1 free, and thus, the sheet P1 is transported by the driving device (not shown) in the direction of the arrow R for sucessively being stacked on the discharge tray 95 through the second sheet discharge roller 91. In this case, as shown in FIG. 3 (f), the sheets are successively piled up on the tray 95 from the under surface, in the same manner as that before the reading in such an order as the surface a· surface b of the sheet p1, the surface a· surface b of the sheet p2, the surface a· surface b of the sheet P3, the surface a· surface b of the sheet Pn, . . . and so forth.

As is seen from the foregoing description, by the arrangement of the present invention, not only the sheets are sorted through image processing in a predetermined order, but they are discharged and stacked on the discharge tray in exactly the same order as they were placed on the sheet feeding table before the feeding. For brevity of the drawings, devices related to the sheet discharging are abbreviated in FIGS. 3(b) to 3(d), while in FIGS. 3(b) to 3(f), the air-suction type sheet attracting device is omitted.

It is needless to say that the air-suction type pick-up device described as employed in the foregoing embodiment may be replaced by a frictional type pick-up device such as a roller or the like. Similarly, the combination of chains and sprockets employed as the wrapping connector driving device for the sheet transport device in the foregoing embodiment may also be replaced by some other means, for example, a combination of belts and pulleys or wires and pulleys, etc. to obtain the same effects as in the above described embodiment.

It should be noted here that the sheet feeding arrangement according to the present invention may be efficiently utilized not only for a sheet having images on both side faces, but also for a sheet bearing an image merely on one side face, if arranged to discharge the sheet after processing only the one side face thereof.

It should also be noted that by providing the sheet feeding table 107 and sheet discharge tray 95 at one side of the apparatus in one direction, improved operability of the arrangement may be realized as well as a compact size.

As is clear from the foregoing description, according to the present invention, sheets are free from being soiled or damaged, while efficient sorting is possible not only for sheets having an image merely on one side face, but for those carrying images on both side faces thereof. Thus, the sheet feeding arrangement is compact in size and highly reliable in operation without the possibility of causing problems during transportation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A sheet handling apparatus for copying and transporting sheets which comprises:
    an image processing apparatus containing an image processing face,
    a sheet processing device disposed above said image processing face and operative to move toward and away from said image processing face,
    a sheet transport device including a pair of wrapping connector driving devices constituted by a combination of chains and sprockets, said sheet transport device turning on itself to form a loop which passes between said image processing apparatus and said sheet pressing device in sequential, opposite directions,
    a driving means for driving the sheet transport device,
    a sheet gripping means connected to said wrapping connector driving device for gripping the edges of the sheet being transported,
    a sheet pickup means for successsively selecting the sheets, one-by-one, for distribution to the sheet gripping means,
    and a sheet discharge device for receiving and transporting sheets received from the sheet transport device, whereby the front and reverse surfaces of said sheet can be successively brought into close contact with the image processing face through the use of the sheet pressing device.

2. The sheet handling apparatus as claimed in claim 1, wherein said sheet pick-up means is of an air-suction type.

3. The sheet handling apparatus as claimed in claim 1, wherein said sheet pick-up means is of a roller frictional type.

4. A sheet handling apparatus for copying and transporting sheets which comprises:
- an image processing apparatus containing an image processing face,
- a sheet processing device disposed above said image processing face and operative to move toward and away from said image processing face,
- a sheet transport device including a pair of wrapping connector driving devices constituted by a combination of belts and pulleys, said sheet transport device turning on itself to form a loop which passes between said image processing apparatus and said sheet pressing device in sequential, opposite directions,
- a driving means for driving the sheet transport device,
- a sheet gripping means connected to said wrapping connector driving device for gripping the edges of the sheet being transported,
- a sheet pickup means for successively selecting the sheets, one-by-one, for distribution to the sheet gripping means,
- and a sheet discharge device for receiving and transporting sheets received from the sheet transport device, whereby the front and reverse surfaces of said sheet can be successively brought into close contact with the image processing face through the use of the sheet pressing device.

5. The sheet handling apparatus as claimed in claim 4, wherein said sheet pick-up means is of an air-suction type.

6. The sheet handling apparatus as claimed in claim 4, wherein said sheet pick-up means is of a roller frictional type.

7. A sheet handling apparatus for copying and transporting sheets which comprises:
- an image processing apparatus containing an image processing face,
- a sheet processing device disposed above said image processing face and operative to move toward and away from said image processing face,
- a sheet transport device including a pair of wrapping connector driving devices constituted by a combination of wires and pulleys, said sheet transport device turning on itself to form a loop which passes between said image processing apparatus and said sheet pressing device in sequential, opposite directions,
- a driving means for driving the sheet transport device,
- a sheet gripping means connected to said wrapping connector driving device for gripping the edges of the sheet being transported,
- a sheet pickup means for successively selecting the sheets, one-by-one, for distribution to the sheet gripping means,
- and a sheet discharge device for receiving and transporting sheets received from the sheet transport device, whereby the front and reverse surfaces of said sheet can be successively brought into close contact with the image processing face through the use of the sheet pressing device.

8. The sheet handling apparatus as claimed in claim 7, wherein said sheet pick-up means is of an air-suction type.

9. The sheet handling apparatus as claimed in claim 7, wherein said sheet pick-up means is of a roller frictional type.

10. A sheet handling apparatus for copying and transporting sheets which comprises:
- an image processing apparatus containing an image processing face,
- a sheet processing device disposed above said processing face and operative to move toward and away from said image processing face,
- a sheet transport device including a pair of wrapping connector driving devices having chains passed around sprockets, said chains turning on themselves to form a loop which passes between said image processing apparatus and said sheet pressing device in sequential opposite directions,
- a driving means for driving the sheet transport device,
- a sheet gripping means connected to the chains and said wrapping connector driving device for gripping the edges of the sheet being transported, said sheet gripping means further including a plurality of gripping claws each having resilient frictional members at the forward ends thereof and attached to a gripping claw support member so as to be selectively opened or closed about a shaft through a predetermined angle, and said sheet gripping means being attached at its opposite ends to attachment elements fixed to the chains through arms having gripping device mounting portions so as to be movable in directions following the movement of the chains,
- a sheet pick-up means for successively selecting the sheets, one-by-one, for distribution to the sheet gripping means, and
- a sheet discharge device for receiving and transporting sheets received from the sheet transport device, whereby the front and reverse surfaces of said sheet can be successively brought into close contact with the image processing face through the use of the sheet processing device.

11. The sheet handling apparatus as claimed in claim 10, wherein said sheet pick-up means is of an air-suction type.

12. The sheet handling apparatus as claimed in claim 10, wherein said sheet pick-up means is of a roller frictional type.

* * * * *